ized by the rotor speed within an over speed range. The invention also relates to a
(12) United States Patent
Nyborg (10) Patent No.: US 7,851,934 B2
(45) Date of Patent: Dec. 14, 2010

(54) METHOD FOR CONTROLLING A WIND TURBINE CONNECTED TO THE UTILITY GRID, WIND TURBINE AND WIND PARK

(75) Inventor: Anders Nyborg, Århus C (DK)

(73) Assignee: Vestas Wind Systems A/S, Randers (DK)

( * ) Notice: Subject to any disclaimer, the term of this patent is extended or adjusted under 35 U.S.C. 154(b) by 0 days.

(21) Appl. No.: 12/404,939

(22) Filed: Mar. 16, 2009

(65) Prior Publication Data

US 2009/0174186 A1 Jul. 9, 2009

Related U.S. Application Data

(63) Continuation of application No. PCT/DK2007/000405, filed on Sep. 12, 2007.

(30) Foreign Application Priority Data

Sep. 14, 2006 (DK) ................. 2006 01184

(51) Int. Cl.
*F03D 9/00* (2006.01)
*H02P 9/04* (2006.01)

(52) U.S. Cl. ......................... 290/44; 290/55
(58) Field of Classification Search ............ 290/44, 290/55
See application file for complete search history.

(56) References Cited

U.S. PATENT DOCUMENTS 2,629,450 A * 2/1953 Fumagalli .............. 416/133

| | | | | |
|---|---|---|---|---|
| 4,461,957 A * | 7/1984 | Jallen | ............ | 290/44 |
| 4,511,807 A * | 4/1985 | Somerville | ........... | 290/44 |
| 5,907,192 A | 5/1999 | Lyons et al. | ........... | 290/44 |
| 6,072,302 A * | 6/2000 | Underwood et al. | ........ | 322/17 |
| 6,137,187 A * | 10/2000 | Mikhail et al. | ........ | 290/44 |
| 6,265,785 B1 | 7/2001 | Cousineau et al. | ........ | 290/44 |
| 6,316,918 B1 * | 11/2001 | Underwood et al. | ........ | 322/20 |
| 6,380,719 B2 * | 4/2002 | Underwood et al. | ........ | 322/36 |
| 6,411,065 B1 * | 6/2002 | Underwood et al. | ........ | 322/20 |
| 6,420,795 B1 * | 7/2002 | Mikhail et al. | ........ | 290/44 |
| 6,600,240 B2 * | 7/2003 | Mikhail et al. | ........ | 307/85 |
| 6,847,128 B2 * | 1/2005 | Mikhail et al. | ........ | 290/44 |

(Continued)

FOREIGN PATENT DOCUMENTS

EP 1007844 B1 7/2004

(Continued)

OTHER PUBLICATIONS

International Searach Report, Mar. 7, 2008 (3 pages).

(Continued)

*Primary Examiner*—T C Patel
*Assistant Examiner*—Pedro J Cuevas
(74) *Attorney, Agent, or Firm*—Wood, Herron & Evans, LLP (57) ABSTRACT

The invention relates to a method for controlling a wind turbine connected to the utility grid comprising steps of detecting a fault of the utility grid, and controlling one or more rotor blades in a fault mode wherein said one or more rotor blades are pitched in order to stabilize the rotor speed within an over speed range. The invention also relates to a wind turbine and a wind park comprising at least two wind turbines.

23 Claims, 6 Drawing Sheets

U.S. PATENT DOCUMENTS

| | | | |
|---|---|---|---|
| 6,856,039 B2* | 2/2005 | Mikhail et al. | 290/44 |
| 6,921,985 B2 | 7/2005 | Janssen et al. | 290/44 |
| 7,095,129 B2* | 8/2006 | Moroz | 290/44 |
| 7,095,131 B2* | 8/2006 | Mikhail et al. | 290/44 |
| 7,289,920 B2* | 10/2007 | Suliman et al. | 702/64 |
| 7,432,686 B2* | 10/2008 | Erdman et al. | 322/44 |
| 7,462,946 B2* | 12/2008 | Wobben | 290/44 |
| 7,528,496 B2* | 5/2009 | Fortmann | 290/44 |
| 7,569,944 B2* | 8/2009 | Oohara et al. | 290/44 |
| 7,633,176 B1* | 12/2009 | Blittersdorf | 290/44 |
| 2001/0048290 A1* | 12/2001 | Underwood et al. | 322/20 |
| 2002/0030365 A1* | 3/2002 | Underwood et al. | 290/40 B |
| 2002/0105189 A1* | 8/2002 | Mikhail et al. | 290/44 |
| 2004/0094964 A1* | 5/2004 | Mikhail et al. | 290/44 |
| 2004/0145188 A1 | 7/2004 | Janssen et al. | 290/44 |
| 2004/0207208 A1* | 10/2004 | Mikhail et al. | 290/44 |
| 2004/0217594 A1 | 11/2004 | Feddersen et al. | 290/44 |
| 2004/0264082 A1* | 12/2004 | Suliman et al. | 361/62 |
| 2005/0253396 A1* | 11/2005 | Mikhail et al. | 290/44 |
| 2006/0001268 A1 | 1/2006 | Moroz | 290/44 |
| 2006/0238929 A1* | 10/2006 | Nielsen | 361/20 |
| 2007/0085343 A1* | 4/2007 | Fortmann | 290/44 |
| 2008/0030027 A1* | 2/2008 | Erdman et al. | 290/40 R |
| 2008/0069692 A1* | 3/2008 | Oohara et al. | 416/31 |
| 2008/0150282 A1* | 6/2008 | Rebsdorf et al. | 290/44 |
| 2008/0277938 A1* | 11/2008 | Oohara et al. | 290/44 |
| 2008/0296898 A1* | 12/2008 | Ichinose et al. | 290/44 |
| 2009/0079193 A1* | 3/2009 | Nielsen et al. | 290/44 |
| 2009/0102195 A1* | 4/2009 | Altemark et al. | 290/44 |
| 2009/0174187 A1* | 7/2009 | Nyborg | 290/44 |
| 2010/0038909 A1* | 2/2010 | Andersen et al. | 290/44 |
| 2010/0061852 A1* | 3/2010 | Potter et al. | 416/31 |
| 2010/0119370 A1* | 5/2010 | Myhr | 416/39 |
| 2010/0148506 A1* | 6/2010 | Letas | 290/44 |

FOREIGN PATENT DOCUMENTS

| | | |
|---|---|---|
| EP | 1561946 A2 | 10/2005 |
| EP | 1666723 A1 | 7/2006 |
| EP | 1719910 A1 | 8/2007 |
| WO | 9007823 A1 | 7/1990 |
| WO | 0133075 A1 | 5/2001 |
| WO | 0166940 A1 | 9/2001 |
| WO | 2004098261 A2 | 11/2004 |

OTHER PUBLICATIONS

International Preliminary Report on Patentability & Written Opinion of the International Searching Authority; PCT/DK2007/000405; Mar. 17, 2009; 6 pages.

* cited by examiner

METHOD FOR CONTROLLING A WIND TURBINE CONNECTED TO THE UTILITY GRID, WIND TURBINE AND WIND PARK

CROSS-REFERENCE TO RELATED APPLICATIONS

The present application is a continuation of pending International patent application PCT/DK2007/000405 filed on Sep. 12, 2007 which designates the United States and claims priority from Danish patent application PA 2006 01184 filed on Sep. 14, 2006, the content of which is incorporated herein by reference.

FIELD OF THE INVENTION

The invention relates to a method for controlling a wind turbine connected to the utility grid, a wind turbine and a wind park.

BACKGROUND OF THE INVENTION

National utility grid companies sets out the strategies and requirements for the connection of power generation equipment to the utility grid. These connection requirements are detailed described in Grid Codes and varies from nation to nation.

One of the topics discussed in the grid codes is the capabilities of a wind turbine when the utility grid experiences a fault. It is essential for the operation of a wind turbine and for a reliable supply of power that a wind turbine can stay connected and synchronized to the utility grid during said grid fault.

System faults are typically short circuits and can be any combination of a three phases and earth short circuits. When a short circuit occur the flow of current results in voltage drops (low voltage situation) throughout the utility grid and the magnitude is dependent of the magnitude of the fault current, the impedance of the short circuit path and the type of short circuit. Further, a low voltage situation may comprise more than one voltage drop e.g. two successive voltage drops.

When a wind turbine experience a utility grid fault the generator speed increases almost immediately as a result of the excessive aerodynamical power that cannot be converted to electrical power. Therefore the aerodynamical power must be reduced drastically throughout the period of utility grid fault.

One method of prior art is to turn the blades of the wind turbine from an operating position to a park position and allow the wind turbine generator to trip offline when the utility grid fault occurs. But as the grid codes typically sets up requirements for a low voltage ride through (LVRT) that requires the wind turbine generator to stay connected, said method of prior art is not compatible with the grid codes.

U.S. Pat. No. 6,921,985 discloses a LVRT system for a wind turbine connected to a utility grid. The blade pitch angle is varied when a low voltage is detected in order to maintain the rotor speed below an over speed trip limit. A problem with the system during a persisting grid fault is that the wind turbine would continue to test the speed trip limit e.g. with the risk of inflicting a wind turbine break down.

It is an object of the present invention to provide an advantageous method of controlling a wind turbine during a utility grid fault in a controllable manner and without the mentioned disadvantage of the prior art.

SUMMARY OF THE INVENTION

The invention provides a method for controlling a wind turbine connected to the utility grid comprising steps of:
  detecting a fault of the utility grid, and
  controlling one or more rotor blades in a fault mode wherein said one or more rotor blades are pitched to stabilize the rotor speed within an over speed range.

Hereby it is ensured, that the wind turbine is reacting to a fault of the utility grid by pitching the rotor blades to a substantially stable speed within the over speed range i.e. to avoid any trip limits. The pitch may subsequently be controlled in order to further stabilize the rotor speed within the over speed range during the fault or even to supply power in order to support the utility grid.

With the term "over speed range" is meant the rotor speed range between a wind turbine rated rotor rpm and an over speed limit which in turn is defined to be the rotor speed rpm where the wind turbine generator trip offline due to rotor over speed.

In one aspect of the invention initiating said fault mode comprises establishing a value of the generated power by the wind turbine and entering said fault mode when the power is above a pre-established limit e.g. 25% of nominal power. Hereby it is ensured that said fault mode will not be initiated when the normal control algorithm will be able to avoid over speeding of the rotor during a grid fault event and will continue operating in normal mode since there is no imminent danger due to the low power in the wind.

In another aspect of the invention the value of said power is established as a direct measurement of generated power or indirectly by measurement of e.g. generator rpm, wind speed or combinations hereof. Hereby it is ensured that various parameters indicating the status of wind turbine can be used as power monitor. Furthermore it is ensured that the influence on the wind turbine from the ambient environment e.g. the utility grid can be monitored.

In another aspect of the invention said one or more rotor blades are pitched to a substantially no acceleration value in order to stabilize the rotor speed within the over speed range. Hereby it is ensured that the rotor is stabilized resulting in no further acceleration of the rotor speed.

With the term "no acceleration value" (NOPA) is meant the pitch angle that gives substantially equilibrium between aerodynamically and electrical generated power, hence giving no acceleration of the generator.

In another aspect of the invention said no acceleration value is established with less than normal wind turbine safety restrictions e.g. with a maximum pitch rate value of 18 degree/sec. Hereby it is ensured that said no acceleration value is reached as fast as possible after detecting a utility grid fault. The wind turbine controller may operate beyond the normal work range of pitch rate values whereby the acceleration of the rotor is minimized and the rotor speed is substantially stabilised. Further, the wind turbine controller may focus only on achieving a no acceleration value e.g. by operating with less than normal wind turbine safety restrictions such as temporally devaluate some feedback values of the wind turbine. This in turn ensures that said over speed limit will not be reached and the wind turbine can therefore stay connected to the grid during the grid fault.

In another aspect of the invention said no acceleration value is established by use of a lookup table and/or by calculation e.g. with a mathematical algorithm involving parameters such as blade Cp-values, wind speed and direction, rotor speed etc. This ensures that said value can be established very fast after the detection of a utility grid fault. Furthermore it is ensured that blade specific parameters can be taken into account whereby said value is optimized.

In another aspect of the invention said no acceleration value is established continuously or when said utility grid fault is detected. Hereby it is ensured that said value always is available when needed incorporating relevant newest updated wind turbine parameters.

In another aspect of the invention said one or more rotor blades are pitched to a target pitch angle value in stabilizing the rotor speed within a defined range controllable by the wind turbine controller. Hereby it is ensured that the rotor is stabilized, resulting in a desired controlled acceleration or deceleration handled by the wind turbine controller whereby the rotor speed limit will not be reached.

In another aspect of the invention said target pitch angle value is established with less than normal wind turbine safety restrictions e.g. with a maximum pitch rate value of 18 degree/sec. Hereby it is ensured that said target pitch angle value is reached as fast as possible after detecting a utility grid fault whereby an uncontrolled acceleration of the rotor is minimized. The wind turbine controller may operate beyond the normal work range of pitch rate values. Further, the wind turbine controller may focus only on achieving said target pitch angle value e.g. by operating with less than normal wind turbine safety restrictions such as temporally devaluate some feedback values of the wind turbine. This in turn ensures that said over speed limit will not be reached and the wind turbine can therefore stay connected to the grid during the grid fault.

In another aspect of the invention said target pitch angle value is established by use of a lookup table and/or by calculation e.g. with a mathematical algorithm involving parameters such as blade Cp-values, wind speed and direction, rotor speed, generated power etc. This ensures that said value can be established very fast after the detection of a utility grid fault. Furthermore it is ensured that blade specific parameters can be taken into account whereby said value is optimized.

In another aspect of the invention said target pitch angle value is established continuously or when said utility grid fault is detected. Hereby it is ensured that said value always is available when need incorporating relevant newest updated wind turbine parameters.

In another aspect of the invention said rotor speed is stabilized at an over speed value or within said defined range, where said defined range is substantially smaller than said over speed range. Hereby it is ensured that rotor speed variations during said fault mode are minimized and the load impact on e.g. the drive train is also minimized.

In another aspect of the invention said over speed value or any value within said defined speed range is below the wind turbine rotor over speed limit. Hereby it is ensured that the wind turbine generator can stay connected to the utility grid during said fault on the utility grid.

In another aspect of the invention said controlling is done on the basis of measured loads on the wind turbine components such as one or more rotor blades, nacelle, tower, foundation or combinations hereof. Hereby it is ensured that the control of e.g. the pitch angle to a said no acceleration value is done safely and controlled taking into account loads on the wind turbine components without reaching the load limit of said components.

The invention also relates to a wind turbine connected to a utility grid comprising at least one blade pitch system to control the pitch of one or more rotor blades, and at least one wind turbine control system including a system performing a method according to any of the method claims.

In another aspect of the invention said performing a method comprises performing a safety mode method during a detected utility grid fault. Hereby it is ensured that the wind turbine is controlled with control values that are adapted to the specific utility grid fault situation and are used until returning to normal grid mode.

In another aspect of the invention said wind turbine supplies the utility grid with power during a grid fault. Hereby it is ensured that the impact of the grid fault is minimized and the returning to the normal level of power production after the grid fault has cleared is eased.

The invention also relates to a wind park comprising at least two wind turbines according to any of the wind turbine claims and at least one detector for detecting failures in the utility grid. Hereby it is ensured that the wind park may actively assist the utility grid during the fault situation or at least not add to the severity of the situation.

BRIEF DESCRIPTION OF THE DRAWINGS

The invention will be described in the following with reference to the figures in which.

DETAILED DESCRIPTION OF THE INVENTION

Figure 1:
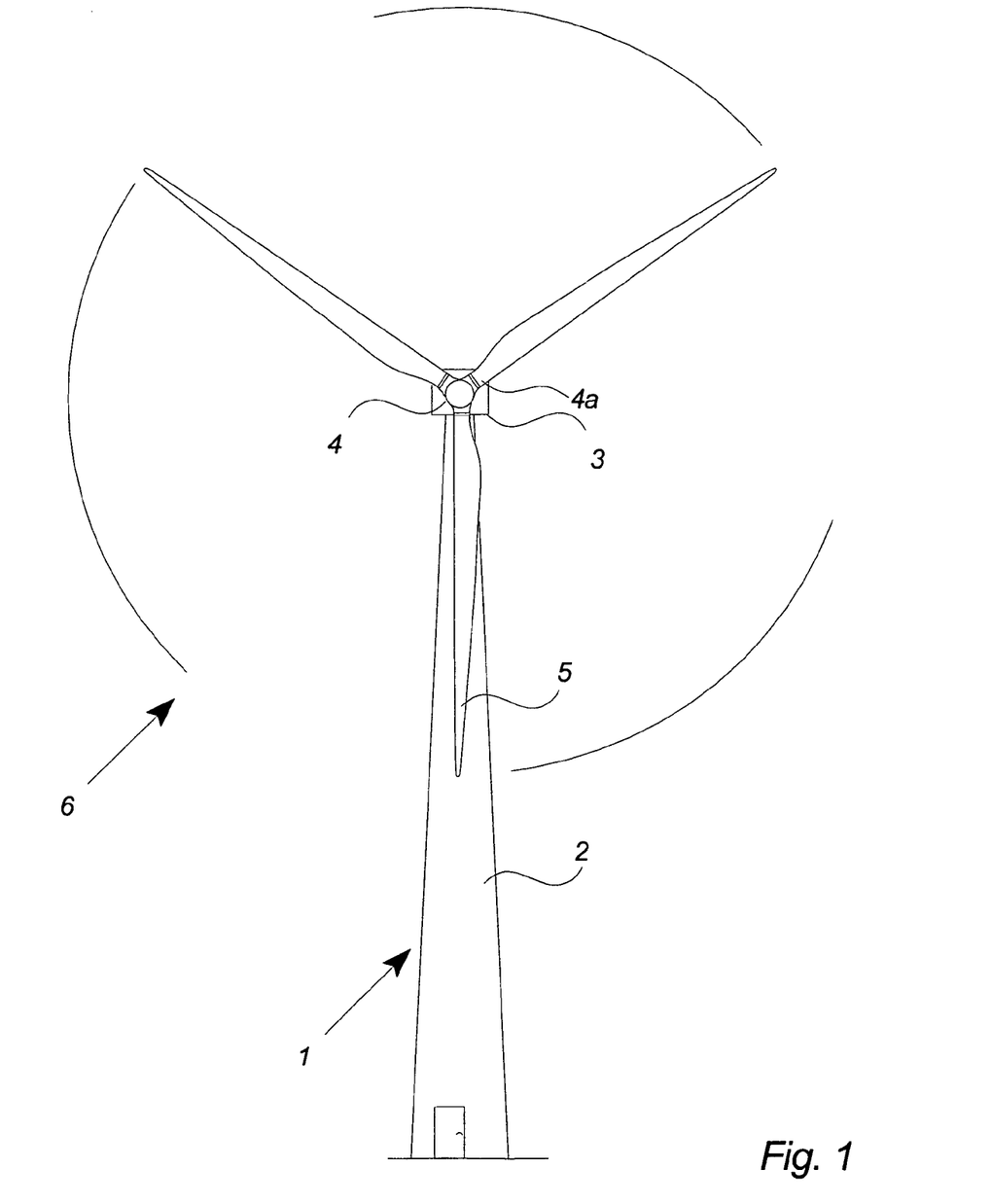
FIG. 1 illustrates a large modern wind turbine including three wind turbine blades in the wind turbine rotor.

FIG. 1 illustrates a modern wind turbine 1 with a tower 2 and a wind turbine nacelle 3 positioned on top of the tower.

The wind turbine rotor, comprising at least one blade such as three wind turbine blades 5 as illustrated, is connected to the hub 4 through pitch mechanisms 4a. Each pitch mechanism includes a blade bearing and pitch actuating means which allows the blade to pitch. The pitch process is controlled by a pitch controller.

As illustrated in the figure, wind over a certain level will activate the rotor and allow it to rotate in a perpendicular direction to the wind. The rotation movement is converted to electric power which usually is supplied to the utility grid as will be known by skilled persons within the area.

Figure 2:
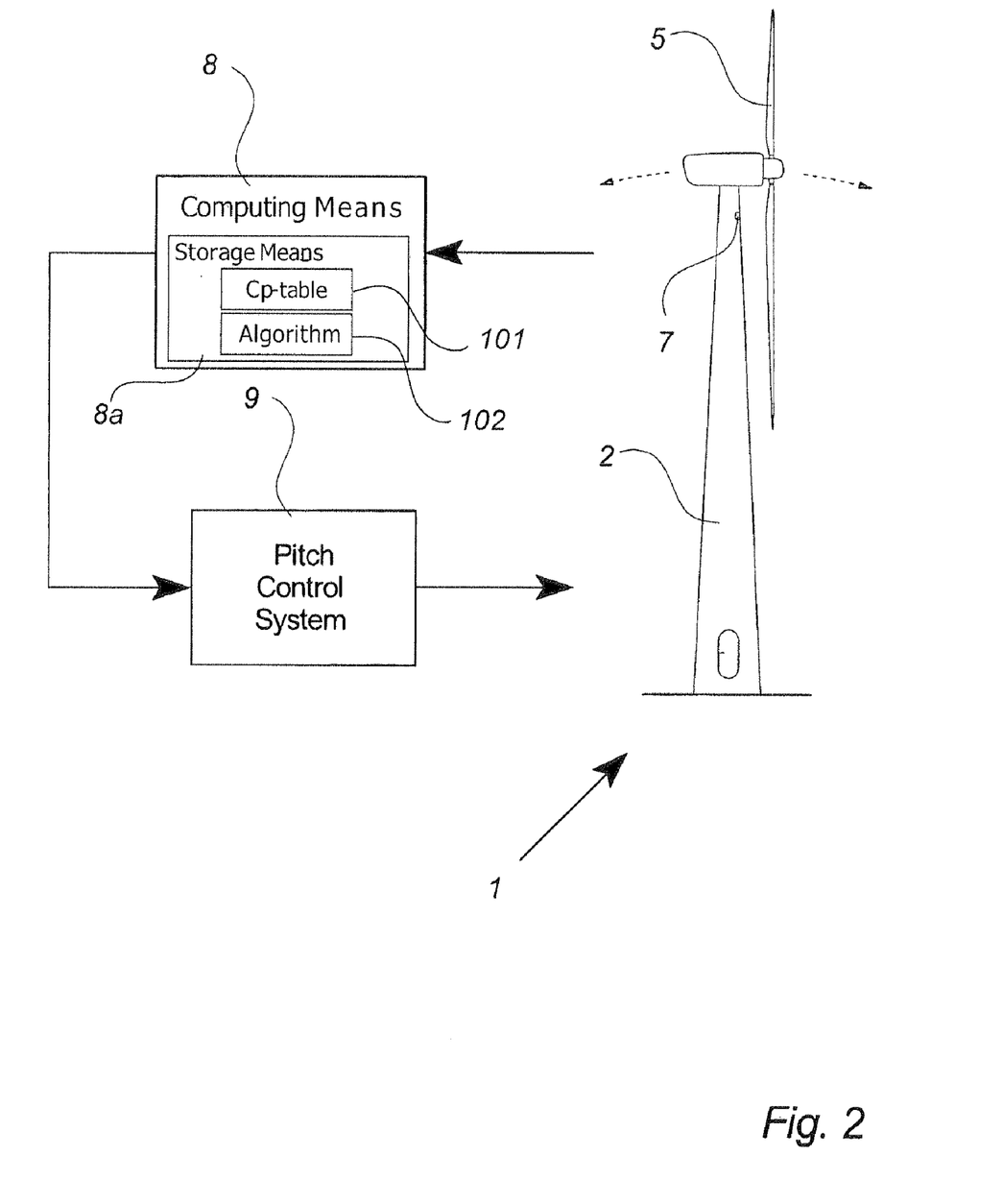
FIG. 2 illustrates schematically a preferred embodiment according to the invention of a wind turbine with a control system for controlling the pitch angles of the wind turbine blades.

FIG. 2 illustrates schematically one preferred embodiment of a wind turbine with a control system, or controller, for controlling the pitch angles of the wind turbine blades.

Data of the wind turbine 1 are measured with sensor means 7 such as pitch position sensors, blade load sensors, rotor azimuth sensors, tower acceleration sensors etc. The measured sensor data are supplied to computing means 8 in order to convert the data to feedback signals. The feedback signals are used in various control systems e.g. the pitch control system 9 for controlling the pitch angle by establishing control values for controlling said at least one wind turbine blade 5.

The computing means 8 preferably includes a microprocessor and computer storage means 8a for continuous control of the said feedback signal.

As indicated by the dashed arrows at the nacelle 3 the wind turbine tower 2 can oscillate resulting in a displacement of said nacelle 3. As will be known by skilled persons within the area said tower can oscillate at its eigenfrequency e.g. as a result of a sudden change in thrust applied to the rotor. Said oscillation can result in excessive loads on said tower and in worst case cause damage.

Figure 3:
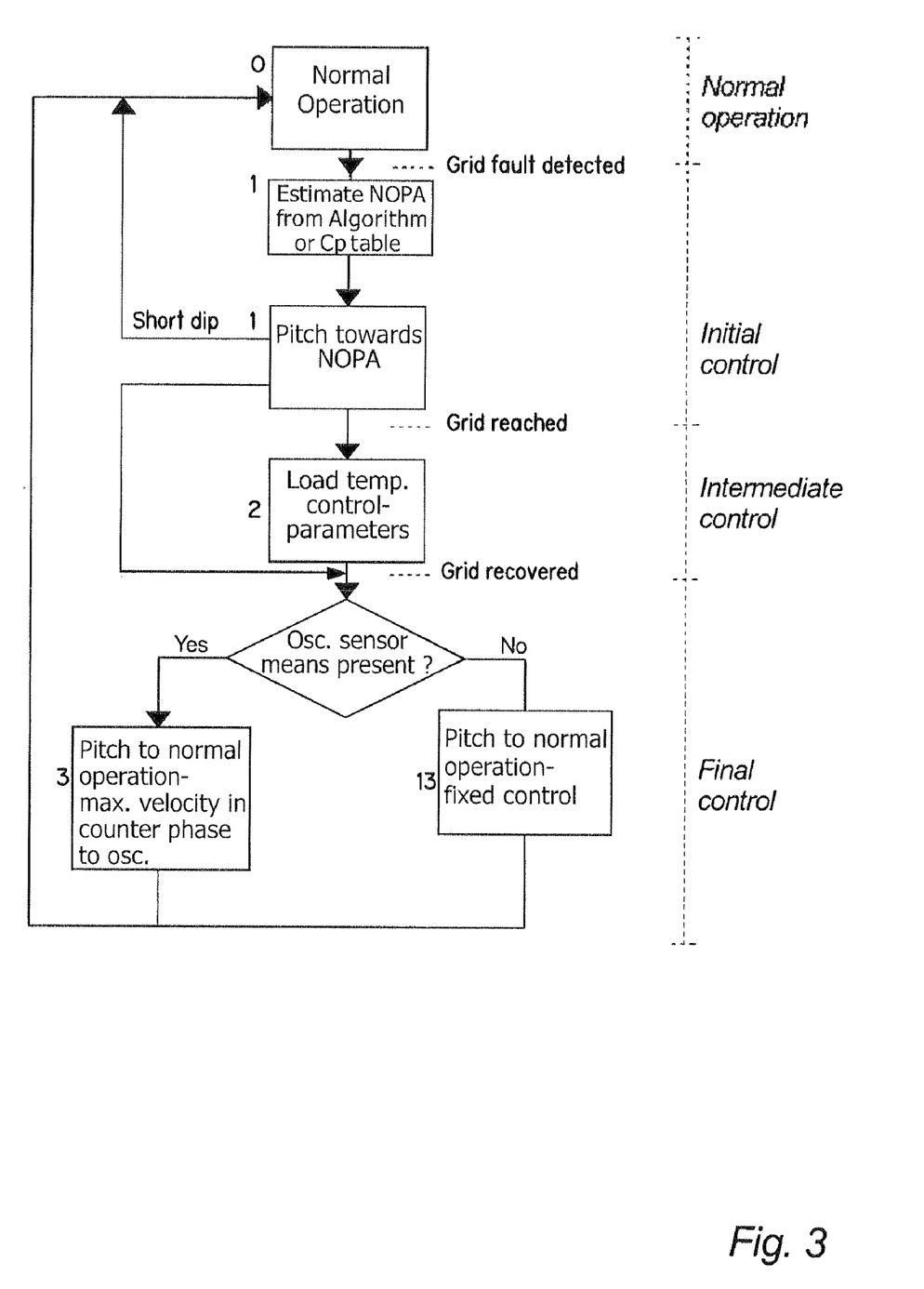
FIG. 3 illustrates the conceptual state-sequence including a method according to the present invention in connection with a utility grid fault event.

FIG. 3 illustrates for one preferred embodiment of the invention schematically a conceptual state-sequence diagram for the invented control algorithm comprising steps of:

Normal operation (state 0)

detecting a utility grid fault event, an initial control of a wind turbine 1 in order to stabilize the wind turbine rotor speed with new control parameters as a response to said utility grid fault event (state 1), an intermediate control of the wind turbine at a stabilized level during the fault event (state 2), detecting a recovery of the grid, and a final control of the wind turbine while returning to normal operating conditions (state 3 or state 13). As indicated on the figure state 3 is entered if means for measuring values of the mechanical oscillations and/or loads are present (a preferred embodiment). State 13 is entered if said means are not present.

For one embodiment of the invention comprising a wind turbine 1 comprising sensor means for measuring values representing mechanical oscillations and/or loads of the wind turbine, a description of each state and the state switch conditions between said states is:

|  | State | Action in state | Switch condition (to go to next state) |
| --- | --- | --- | --- |
|  | 0 | Normal operation | If utility grid fault detected then switch to state 1. |
| Initial control | 1 | Estimation of no acceleration pitch angle (NOPA). Pitch towards NOPA with predefined control parameters e.g. pitch velocity. | If "short dip" then switch to state 0. If grid recovery has been detected before NOPA has been reached then switch to state 2. If estimated NOPA has been reached then switch to state 2. |
| Intermediate control | 2 | If NOPA reached: Wind turbine controller is loaded with new temporary parameter settings at an rotor over speed. If NOPA not reached: Wind turbine controller is loaded with pre-defined control parameters. | If grid recovery is detected AND wind turbine oscillations and/or loads indicate that pitching in will occur in counter phase with said oscillations and/or loads then switch to state 3. |
| Final control | 3 | Pitch back to pitch angle value obtained before detected grid fault with predefined control parameters e.g. with maximal pitch rate. | If actual pitch angle value = pitch angle value obtained before detected grid fault then switch to state 0. |

For another embodiment of the invention comprising wind turbine 1 without sensor means for measuring values representing the wind turbine mechanical oscillations and/or loads, a description of each state and the state switch conditions between said states is:

|  | State | Description | Switch condition (to go to next state) |
| --- | --- | --- | --- |
|  | 0 | Normal operation | If utility grid fault detected then switch to state 1. |
| Initial control | 1 | Estimation of no acceleration pitch angle (NOPA). Pitch towards NOPA with predefined control parameters e.g. pitch velocity. | If "short dip" then switch to state 0. If grid recovery has been detected before NOPA has been reached then switch to state 2. If estimated NOPA has been reached then switch to state 2. |

-continued

| State | | Description | Switch condition (to go to next state) |
|---|---|---|---|
| Intermediate control | 2 | If NOPA reached: Wind turbine controller is loaded with new temporary parameter settings at a rotor over speed. If NOPA not reached: Wind turbine controller is loaded with pre-defined control parameters. | If grid recovery is detected then switch to state 13. |
| Final control | 13 | Pitch back to pitch value obtained before detected grid fault with predefined control parameters e.g. fixed pitch rate. | If actual pitch angle value = pitch angle value obtained before detected grid fault then switch to state 0. |

Common for both embodiments are states 0, 1 and 2:

State 0:

The mode of normal operation.

If the generated power by the wind turbine is below a predefined limit such as 25% of nominal power, said fault mode will not be initiated upon detecting a grid fault, as the normal control algorithm will be able to avoid over speeding of the rotor during said grid fault event and will continue operating in normal mode since there is no imminent danger due to the low power in the wind.

State 1 (initial control):

When a grid fault has been detected said state 1 is entered. The basis of this state of the invented control algorithm is to pitch one or more wind turbine rotor blades 5 out of the wind immediately after a fault on the utility grid is detected in order to avoid over speeding of the rotor due to excessive aerodynamically power acting on said rotor.

For one embodiment of the invention the wind turbine rotor blades 5 are pitched to a no acceleration pitch angle (NOPA) which is defined to be the pitch angle that gives equilibrium between aerodynamically power and any wind turbine losses and electrical generated power, hence giving no or substantially no acceleration of the generator. For one embodiment NOPA is calculated immediately after the grid fault is detected by table lookup in a Cp-table 101. For another embodiment NOPA is established by calculation e.g. with a mathematical algorithm 102.

In a preferred embodiment of the invention the wind turbine rotor blades 5 are pitched to a target pitch angle (TPA) that gives a disequilibrium between aerodynamically power and any wind turbine losses and electrical generated power, hence initially resulting in a further acceleration or deceleration of the generator, but with the level of acceleration or deceleration within the operating span of the wind turbine controller.

For one embodiment of the invention if the grid fault is sufficiently short (a short dip) to have only a low impact on the turbine load, a short dip situation is detected and it is preferred to obtain normal operation and active power production as before said short dip as soon as possible. Consequently for this embodiment the invented algorithm is able to determine the level of significant loads on the turbine and on that basis determine if the grid fault control sequence can be quitted or it needs to be completed.

For another embodiment of the invention where the grid fault lasts too long to be detected as a said short dip but a grid recovery occurs before e.g. said NOPA is reached, it is preferred to obtain normal operation and active power production as before the grid fault as soon as possible. For this situation a direct jump to normal operation mode and normal operation settings would have a too high impact on the wind turbine. Consequently for this embodiment the invented algorithm jumps directly to state 2 where predefined control parameters are re-obtained as explained below.

A good indicator of how much the turbine has been affected, is how much said aero dynamical thrust has been reduced. Pitch angle, tower acceleration, tower load, time or combinations hereof can be fair assumptions herefore. For the example of pitch angle as said indicator, to determine when to use said short dip control strategy or to continue the grid fault control strategy to the next state, said algorithm continuously supervises how far the actual pitch angle is from the recent pitch angle before the grid fault. Consequently if a grid recovery is detected and the difference between the actual pitch angle and a recent pitch angle immediately before said grid fault exceed a certain predefined level, said control algorithm will continue the grid fault control algorithm. Otherwise the grid fault control algorithm will be terminated as fast as possible by returning to state 0 i.e. setting the references for e.g. pitch angle, power and generator rpm to the settings immediately before detecting said grid fault.

State 2 (intermediate control):

The basis of this state of the invented control algorithm is to keep the wind turbine operating within a defined range controllable by the wind turbine controller and connected to the utility grid until the grid has recovered.

For one embodiment when NOPA is reached, wind turbine control is initialized with the present control settings as reference e.g. generator rpm and pitch angle, in order to keep the generator rpm constant or nearly constant at a level above the nominal speed.

For one embodiment where pitching out has been stopped due to detected grid recovery before reaching said NOPA, said state 2 is initiated and predefined control parameters are re-obtained.

The control sequence stays in this state with the present control settings at least until recovery of the utility grid has been detected.

For one preferred embodiment, when means for measuring values representing the wind turbine mechanical oscillations and/or loads are present, a switch to the next state (state 3) can be initiated when pitching in the rotor blades will occur in counter phase to the mechanical oscillations and/or loads of the wind turbine e.g. oscillations resulting form a tower acceleration. I.e. pitching said rotor blades will be done in such a way that the oscillations and/or loads that will be generated by pitching said rotor blades back to normal operation is controlled and generated in counter phase to the existing oscillations and/or loads causing a dampening of the summarized oscillations and/or loads.

For another preferred embodiment, when means for measuring values representing the wind turbine mechanical oscillations and/or loads are not present, said switching to the next state (state 13) can be initiated as soon as recovery of the utility grid has been detected.

State 3: (final control—if sensor means for measuring mechanical wind turbine oscillations and/or loads are present).

In order to return to normal production, reapplying of thrust is necessary by pitching the rotor blades back to their operation position.

As an example of this preferred embodiment, the alternating aerodynamic torque under which the tower has been influenced, caused by the sudden drop in thrust when pitching out to e.g. NOPA (state 1), the tower will oscillate with its eigenfrequency when the grid fault has recovered resulting in excessive physical loads on the wind turbine components, especially the tower construction.

For this example a switch to state 3 has be initiated when the tower acceleration signal is within a predefined window regarding amplitude and direction.

The pitch angle is ramped back in towards normal production pitch angle with a maximum pitch velocity. Said pitch angle can e.g. be the value as before the detected grid fault event or if conditions has changed during the grid fault event, a new desired pitch angle. Hereby it is achieved that a maximal dampening of said tower oscillation is obtained as well as the rotor speed is decreased towards the rotor speed before the grid fault event.

State 13: (final control—if sensor means for measuring wind turbine oscillations and/or loads are not present).

In order to return to normal production reapplying of thrust is necessary by pitching the rotor blades back to their operation position i.e. the pitch value obtained before detecting a grid fault with predefined control parameters e.g. fixed pitch rate.

As an example of this preferred embodiment the slope of the pitch rate can be calculated as:

$$Pitchrate = \frac{(\theta actual - \theta predip)}{Trampback}$$

where

θactual=is the actual pitch angle

θPredip=is the pitch angle before the grid fault event or, if conditions has changed during the fault event, a new desired pitch angle.

$T^{rampback}$=a predefined ramp back time

In one embodiment the $T^{rampback}$ must be defined to be longer than one period of the wind turbine tower eigen-frequency in order not to cause positive interference on the tower oscillation when ramping back i.e. for a wind turbine tower with an eigen-frequency of e.g. 0.5 Hz the $T^{rampback}$ must be defined to be longer than 2 seconds such as up to 4 seconds.

In another embodiment for another type of tower with an eigenfrequency of e.g. 1 Hz the $T^{rampback}$ must be defined to be longer than 1 second such as 1.5 seconds.

For an embodiment of a wind turbine tower wherein the tower is very rigid e.g. a short tower the $T^{rampback}$ may be chosen to a shorter period of time than a taller and more flexible tower such as the above mentioned embodiments.

Figure 4:
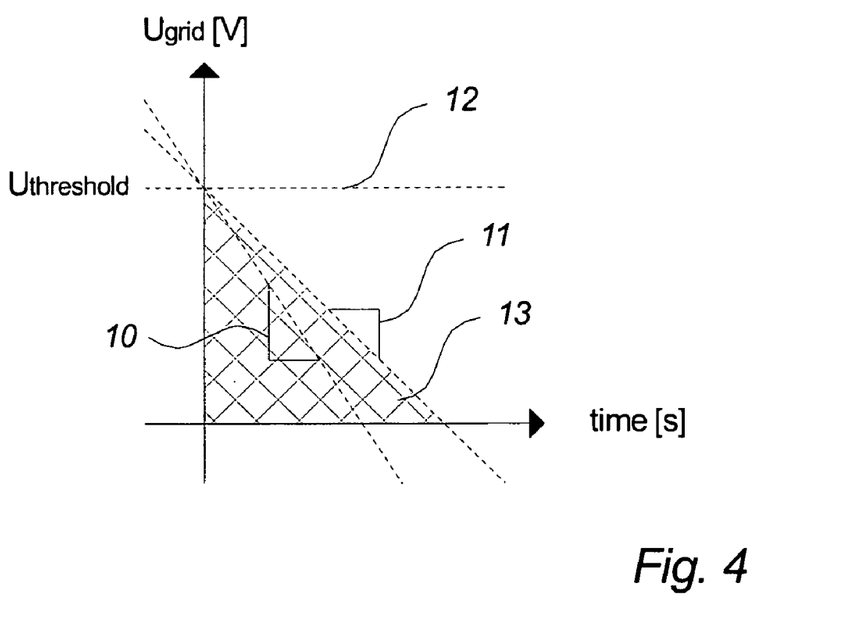
FIG. 4 illustrates two of at least three conditions that must be met in order to detect a utility grid fault event.

FIG. 4 illustrates for one embodiment of the invention conditions that are to be met for the detection of said grid fault event and thereby initiation of a safety mode where the wind turbine is controlled by the invented grid fault control algorithm.

Firstly (not illustrated) the recent generated power must be higher than a predefined limit. If the generated power is less, the normal control algorithm will be able to avoid over speeding or the rotor during a grid fault event and the wind turbine will continue operating in normal mode since there is no imminent danger for e.g. over speeding of the rotor due to the low power in the wind.

Secondly the slope of the grid voltage drop 10 must be higher than a predefined slope limit 11. The slope limit is defined by the operating range of the normal wind turbine controller and its ability to adapt to alternating grid voltages in order to keep control and avoid over speeding of the rotor.

Thirdly the voltage drop must be of a certain predefined size i.e. the grid voltage must drop to below a threshold value $U_{threshold}$ 12.

If said three conditions are met the grid voltage is within the crossed area 15 meaning that a utility grid fault is detected and said grid fault control algorithm is initiated.

Figure 5:
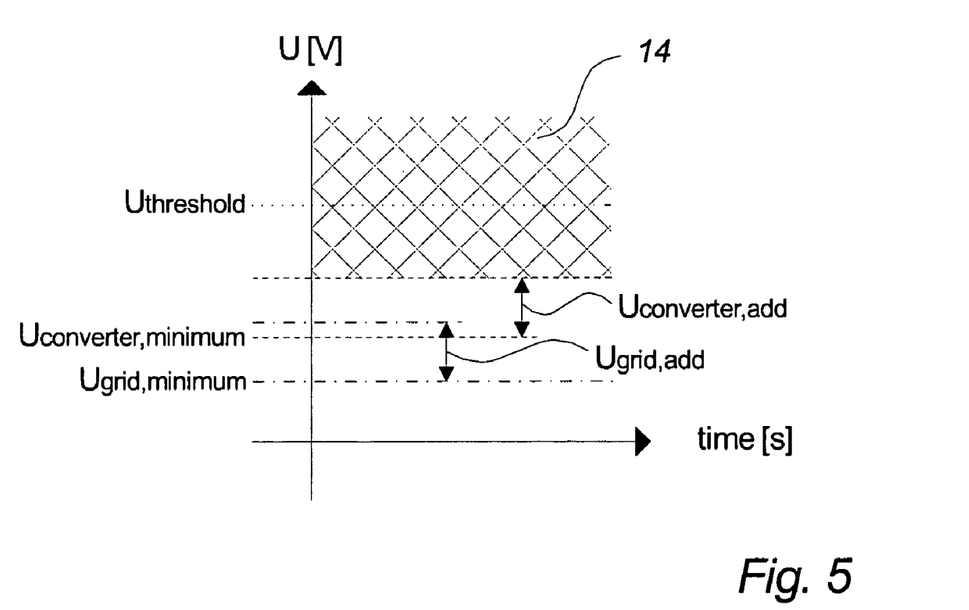
FIG. 5 illustrates conditions that must be met in order to detect that the utility grid has recovered.

FIG. 5 illustrates for one embodiment of the invention conditions that are to be met for the detection of a grid recovery and thereby allowing the control algorithm to proceed towards normal operation.

Firstly if the grid voltage rises above a predefined low voltage limit for normal operation $U_{threshold}$ 12 the turbine may obtain normal operation.

Otherwise the turbine may obtain normal operation if the grid voltage rises a predefined amount $U_{grid,add}$ above the present low voltage level $U_{grid,minimum}$ during the grid fault AND the voltage is a certain predefined amount $U_{converter,add}$ above the limit $U_{converter,minimum}$ where the wind turbine converter is able to produce active power.

If said conditions are met the grid voltage is within the crossed area 14 meaning that the grid has recovered and said grid fault control algorithm is allowed to proceed towards normal production.

Figure 6:
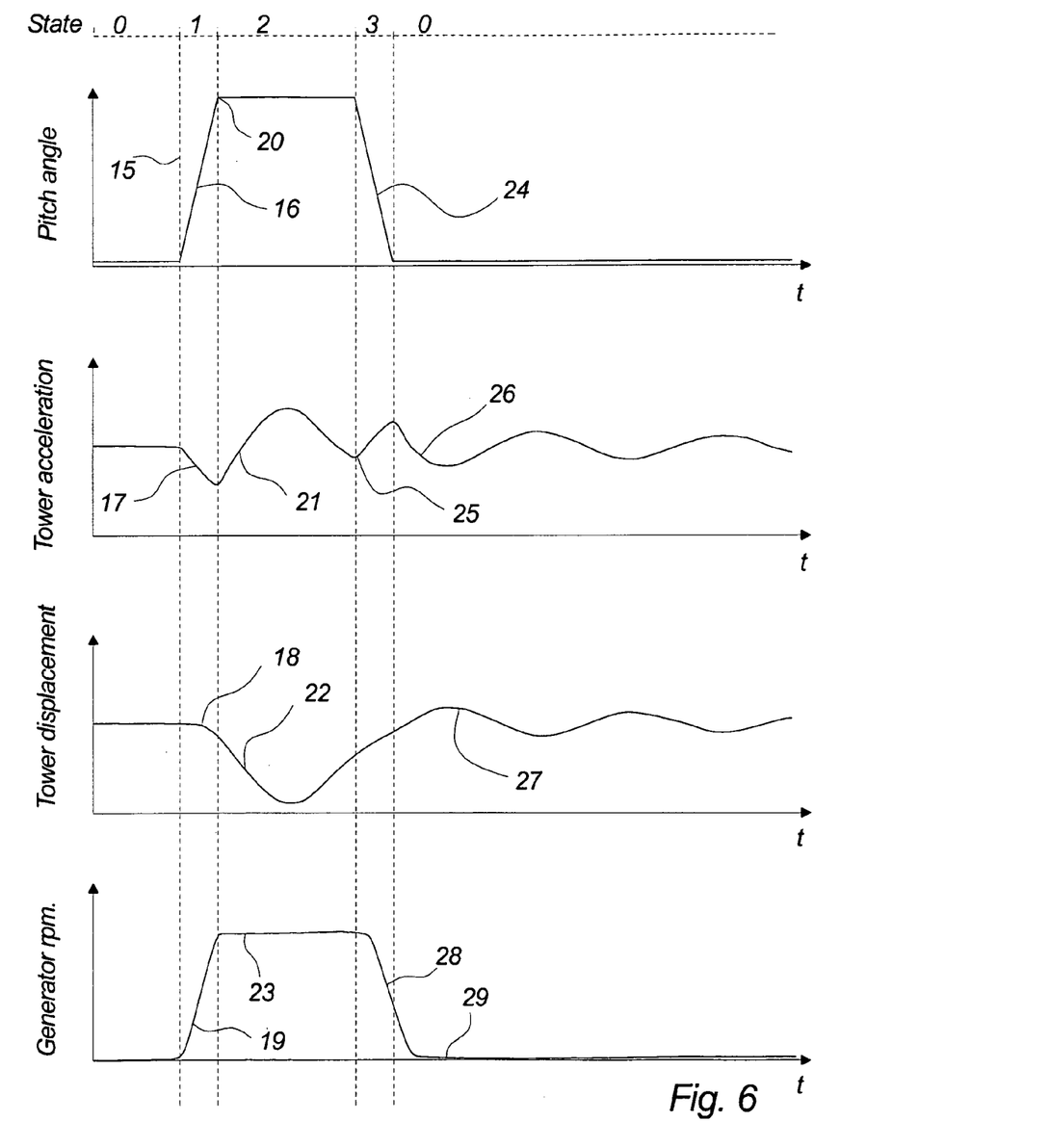
FIG. 6 illustrates the states in a timing diagram of a first embodiment in connection with a utility grid fault event.

FIG. 6 illustrates schematically one embodiment of the technique, where sensor means for measuring tower acceleration is present and used. A simplified timing diagram shows the relation between control states, pitch angle, tower acceleration, tower displacement and generator rpm during a grid fault.

State 0:

The pitch angle, tower acceleration, tower displacement and generator rpm. are ideal constant during normal operation.

State 1:

When a utility grid fault is detected 15 the wind turbine rotor blade or blades are pitched towards e.g. NOPA 16. The hereby sudden change in aerodynamical thrust is reflected by a tower acceleration and displacement 17, 18. Furthermore the generator rpm is increased due to an excessive amount of aerodynamical power 19.

State 2:

When said pitch angle reaches e.g. NOPA 20, yet another opposite directed change in thrust occurs and the tower will start oscillating at its eigenfrequency 21, 22. The generator rpm is here stabilized at an over speed level 23 as there now is a balance between incoming aerodynamic power and generated power.

State 3:

The rotor blade or blades are pitched back to operational settings 24 when a grid recovery has been detected and for this embodiment state 3 is entered when said tower acceleration goes negative 25 i.e. reapplying of aerodynamical thrust is in counter phase to the tower acceleration. The result is damped tower acceleration 26 when returning to normal operating mode (state 0), producing only a damped tower displacement 27 whereby loads on the tower has been reduced. Furthermore the generator rpm is decreased 28 ideal to the level as before entering said grid fault mode 29.

Figure 7:
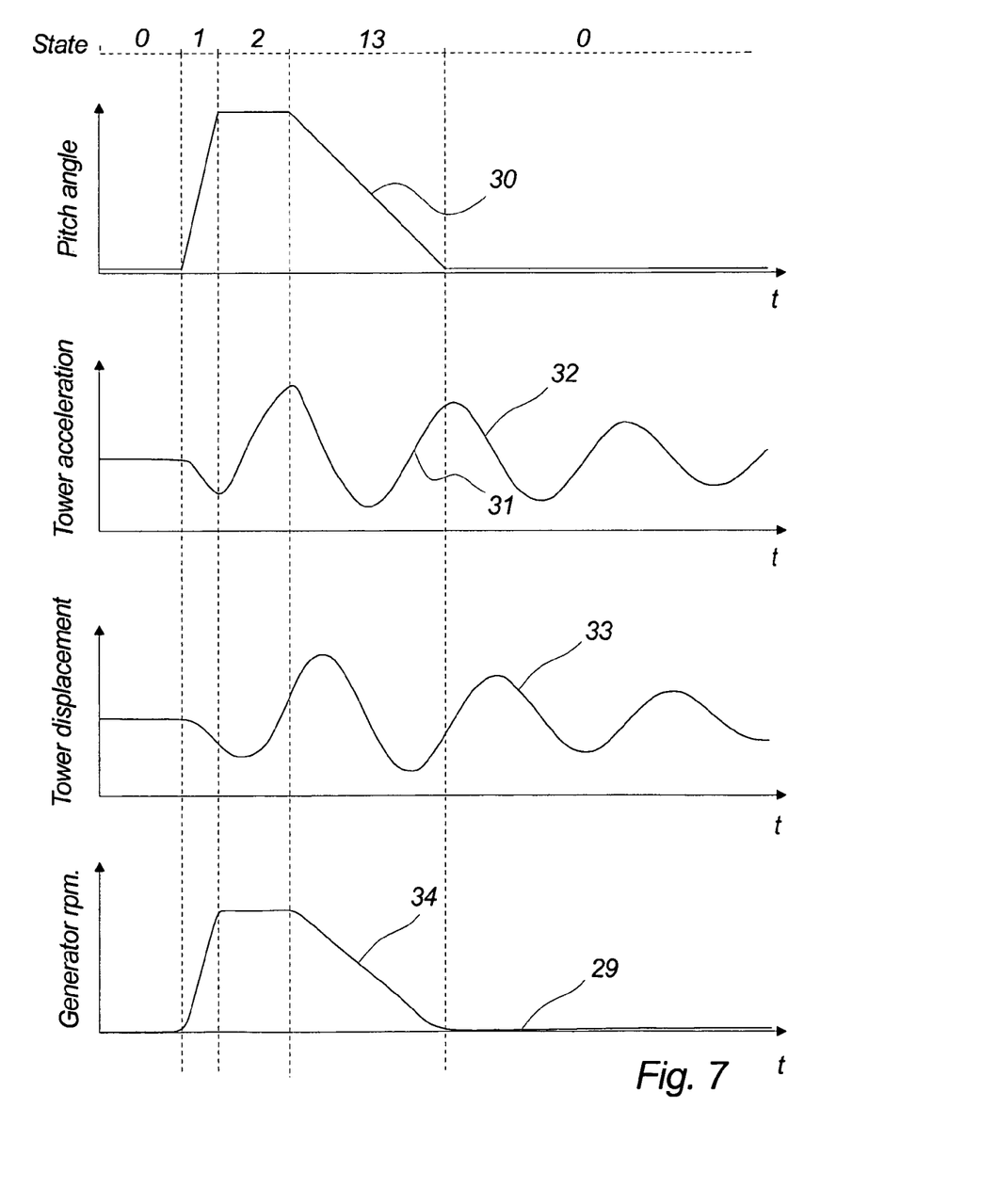
FIG. 7 illustrates the states in a timing diagram of another embodiment in connection with a utility grid fault event.

FIG. 7 illustrates schematically another embodiment of the technique, where sensor means for measuring mechanical oscillations and/or loads are not present or at least not used, a simplified timing diagram showing the relation between control states, pitch angle, tower acceleration and generator rpm. during a grid fault.

The description for states 0, 1 and 2 are same for this embodiment as described for FIG. 6 and will not be repeated here.

State 13:

The rotor blade or blades are pitched back to operational settings 30 with predefined control parameters e.g. $T^{rampback}$. For this embodiment state 13 is entered immediately after grid recovery has been detected. The pitch rate is chosen to be of a value that does not result in significant further excessive mechanical oscillations e.g. tower acceleration 31, 32.

The result is a tower acceleration 31, 32 when returning to normal operating mode (state 0), producing a tower displacement 33 whereby loads on the tower are kept within allowable limits. Furthermore the generator rpm is decreased 34 ideal to the level as before entering said grid fault mode 29.

The invention described has been exemplified above with reference to specific examples of control algorithms for a wind turbine during LVRT. However, it should be understood that the invention is not limited to the particular examples but may be designed and altered in a multitude of varieties within the scope of the invention as specified in the claims e.g. with use of other algorithm states or measured/detected/established/estimated values.

What is claimed is:

1. A method for controlling a wind turbine connected to a utility grid, the method comprising:
   detecting a fault of the utility grid; and
   in response to detection of the fault, controlling a pitch of one or more rotor blades of a rotor of the wind turbine in a fault mode to stabilize a speed of the rotor between a first value rated for the rotor of the wind turbine and a second value at which a generator of the wind turbine is tripped offline from the utility grid.

2. The method according to claim 1 further comprising:
   establishing a value of generated power by the wind turbine and entering said fault mode when the generated power is above a pre-established limit.

3. The method according to claim 2 wherein the value of said generated power is established as a direct measurement of generated power or indirectly by measurement of generator rpm, wind speed or combinations thereof.

4. The method according to claim 2 wherein the pre-established limit is 25% of nominal power.

5. The method according to claim 1 wherein said one or more rotor blades are pitched to a substantially no acceleration value of the speed between the first and second values.

6. The method according to claim 5 wherein said no acceleration value is established with less than normal safety restrictions for the wind turbine.

7. The method according to claim 6 wherein said no acceleration valve is established with a maximum pitch rate valve of 18 degree/sec.

8. The method according to claim 5 wherein said no acceleration value is established by use of a lookup table, by calculation, or by both use of a lookup table and by calculation.

9. The method according to claim 8 wherein the calculation employs a mathematical algorithm involving at least one of the following parameters: Cp-values, wind speed and direction, or rotor speed.

10. The method according to claim 5 wherein said no acceleration value is established continuously or when said utility grid fault is detected.

11. The method according to claim 1 wherein said one or more rotor blades are pitched to a target pitch angle value in stabilizing the rotor speed within a defined range controllable by a wind turbine controller.

12. The method according to claim 11 wherein said target pitch angle value is established with less than normal safety restrictions for the wind turbine.

13. The method according to claim 12 wherein said target pitch angle value is established with a maximum pitch rate value of 18 degree/sec.

14. The method according to claim 11 wherein said target pitch angle value is established by use of a lookup table, by calculation, or by both use of a lookup table and by calculation.

15. The method according to claim 14 wherein the calculation employs a mathematical algorithm involving at least one of the following parameters: Cp-values, wind speed and direction, rotor speed, or generated power.

16. The method according to claim 11 wherein said target pitch angle value is established continuously or when said utility grid fault is detected.

17. The method according to claim 11 wherein said defined range is substantially smaller than a difference between the first and second values of the rotor speed.

18. The method according to claim 11 wherein said controlling is done on the basis of measured loads on the wind turbine components.

19. A wind turbine connected to a utility grid comprising:
   at least one blade pitch system to control the pitch of one or more rotor blades; and
   at least one wind turbine control system including a system performing a method according claim 1.

20. The wind turbine according to claim 19 wherein said performing a method comprises performing a safety mode method during a detected utility grid fault.

21. The wind turbine according to claim 19 wherein said wind turbine supplies the utility grid with power during a grid fault.

22. A wind park comprising at least two wind turbines according to claim 19 and at least one detector for detecting failures in the utility grid.

23. The method according to claim 1 wherein the pitch of one or more rotor blades of the rotor of the wind turbine is controlled in the fault mode when said utility grid fault is detected.

* * * * *

UNITED STATES PATENT AND TRADEMARK OFFICE
CERTIFICATE OF CORRECTION

| | | |
|---|---|---|
| PATENT NO. | : 7,851,934 B2 | Page 1 of 1 |
| APPLICATION NO. | : 12/404939 | |
| DATED | : December 14, 2010 | |
| INVENTOR(S) | : Anders Nyborg | |

It is certified that error appears in the above-identified patent and that said Letters Patent is hereby corrected as shown below:

In column 1:
Line 24, change "sets" to --set--.
Line 27, after "detailed", insert --and-- and change "varies" to --vary--.
Line 36, after "of", delete "a".
Line 37, change "occur" to --occurs--.
Line 39, change "dependent of" to --dependent on--.
Line 43, change "experience" to --experiences--.
Line 53, change "sets" to --set--.

In column 2:
Line 19, change "trip" to --trips--.
Line 33, change "hereof" to --thereof--.

In column 8:
Line 64, change "form" to --from--.
Line 67, change "is" to --are--.

In column 9:
Line 16, change "influenced" to --influencing--.
Line 28, change "has" to --have--.
Line 52, change "has" to --have--.

In column 11:
Line 6, change "has" to --have--.

Signed and Sealed this
First Day of March, 2011

David J. Kappos
*Director of the United States Patent and Trademark Office*